Dec. 17, 1963 A. J. KORNBLUH ETAL 3,114,874
CONSTANT RATIO TRANSFORMERS
Filed March 29, 1962
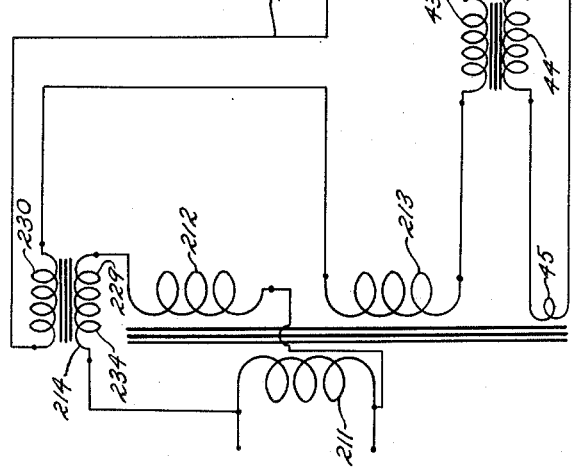
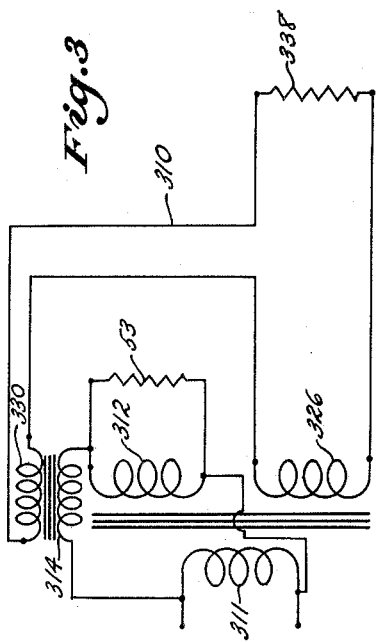
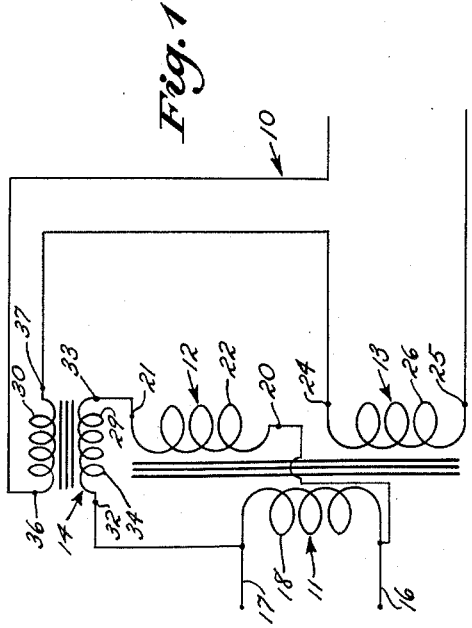
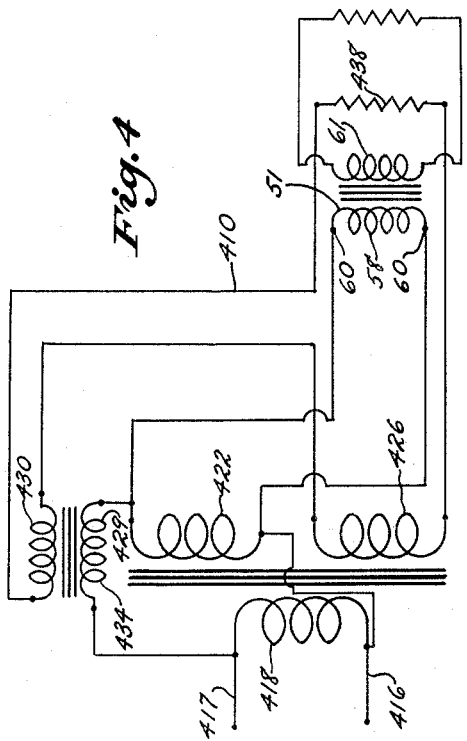

United States Patent Office 3,114,874
Patented Dec. 17, 1963

3,114,874
CONSTANT RATIO TRANSFORMERS
Abraham J. Kornbluh, Binghamton, and Eugene L. Brayning, Vestal, N.Y., assignors to Transformers, Incorporated, Vestal, N.Y., a corporation of New York
Filed Mar. 29, 1962, Ser. No. 183,569
4 Claims. (Cl. 323—45)

This invention relates generally to the field of inductive transformers, and more particularly to an improved type in which the secondary or induced voltage is maintained at the same ratio to the input voltage, irrespective of the value of the input voltage or its frequency.

In many electronic applications it is desirable to capacitively isolate a certain portion of a circuit from the remaining portions thereof, while preserving the voltage ratio of such circuit in the isolated positions. It is known that portions of a circuit can be inductively coupled using transformers and that the only practical manner of accomplishing this is to use a proportional number of turns in the primary and the secondary of the transformer employed to obtain the required voltage ratio.

This procedure always results in a loss during operation, owing to a failure to achieve 100% efficiency in the operation of the device. While it is practically impossible to bring the efficiency of such a device to 100%, we have found it possible by structural modification to maintain the voltage of the secondary winding proportional to the input or primary voltage within extremely close tolerances while still maintaining extremely high capacitive and resistive isolation. Briefly, the inventive structure contemplates providing a transformer having a single primary and two secondary windings, the secondary windings having identical couplings to the primary winding, so that upon occurrence of a voltage change in one of the secondaries due to a change of the efficiency of the primary, the other secondary changes to the same degree. The low side of one of the secondary windings, which may be called the reference winding, is connected directly to the low side of the primary winding, while the other secondary or output winding is either connected to a load or left open circuited. The high side of the reference winding is then compared with the high side of the primary or any predetermined fraction of the primary if the ratio of the transformer is to be other than 1 to 1 and the error voltage then obtained is added in series to the output secondary by the use of a small transformer or a small transformer in conjunction with an operational amplifier.

It is therefore among the principal objects of the present invention to provide an improved transformer circuit capable of producing an output voltage closely corresponding to the input voltage or to a predetermined fraction of the input voltage within very close tolerances.

Another object of the invention lies in the provision of an improved transformer having a single primary winding, and a pair of secondary windings, one of said secondary windings providing the output voltage of the transformer, and the other of said windings being employed as a reference winding for controlling the additional voltage supplied to the output winding to maintain a constant output to input voltage relationship.

A further object of the invention lies in the provision of an improved transformer circuit of the class described, in which the cost of fabrication may be of a reasonably low order with consequent wide sale, distribution and use.

A feature of the invention lies in the fact that it is possible to compensate the output voltage both in the presence and the absence of load across the output winding.

Another feature of the invention lies in the fact that the voltage relationship of the secondary to the primary can now be maintained to an accuracy as high as one part in 10 million. As the state of the art progresses, higher accuracies may be maintained.

These objects and features, as well as other incidental ends and advantages, will more fully appear in the progress of the following disclosure, and be pointed out in the appended claims.

In the drawings, to which references will be made in the specification, similar reference characters have been employed to designate corresponding parts throughout the several views.

FIGURE 1 is a schematic view of a first embodiment of the invention.

FIGURE 2 is a schematic view of a second embodiment of the invention.

FIGURE 3 is a schematic view of a third embodiment of the invention.

FIGURE 4 is a schematic view of a fourth embodiment of the invention.

In accordance with the first embodiment of the invention, the device, generally indicated by reference character 10 (FIGURE 1), includes a primary winding 11, a first or reference secondary winding 12, a second or output secondary winding 13, and an error-correcting transformer 14.

The primary winding 11 may be of any desired number of turns, and includes a pair of input terminals 16 and 17, which interconnect with the turns, generally indicated by reference character 18.

The first secondary winding 12 includes an input terminal 20 connected to the input terminal 16 of the primary winding 11, and a second terminal 21 connected in series with the input terminal 17 (through the error-correcting transformer 14). The number of turns, generally indicated by reference character 22, corresponds to the number of turns 18, as the present device does not contemplate the stepping up of the voltage, but rather the isolation of the voltage from the voltage source. It will be understood that stepping down may be accomplished by using a proportional number of turns in the secondary winding.

The second secondary winding 13 includes output terminals 24 and 25 which are free of interconnection with the primary winding 11, and an identical or proportional number of turns 26. Although the invention does not contemplate a specific design of transformer, the secondary windings 12 and 13 are situated with respect to the primary winding so as to be subjected to the identical inductive influence, and to therefore induce identical voltages. This being so, it is apparent that any variance in the induced voltage of the winding 13 will be sensed in the winding 12.

The error-correcting transformer 14 is preferably relatively small in capacity, since it need induce only small corrective voltages, and includes a primary winding 29 having input terminals 32 and 33 in series with the connection between the terminals 21 and 17, and a relatively small number of turns indicated by reference character 34. The secondary winding 30 thereof includes output terminals 36 and 37 which are in series with the output terminal 24 and the load, generally indicated by reference character 38.

During operation of the device 10, it will be apparent that voltage approximately equal to that supplied to the primary winding 11 will be induced in the secondary windings 12 and 13. The difference, owing to absence of 100% efficiency, will be identical in each of the two secondary windings, since both are subject to the same inductive currents. Since the first or reference secondary winding 12 is connected in series with the primary winding 29 of the error-correcting transformer, and in parallel with the primary winding 11, it follows that the voltage drop across the primary 11 and the series connection of the secondary winding 12 and primary winding 29 must be equal. It further follows that the voltage in the primary winding 29 must be equal to the difference between the voltage in the primary winding 11 and the secondary winding 12. By employing the primary winding 29 to induce an identical voltage in the secondary winding 30, this voltage may be added in series with the output of the second or output winding 13 to provide a voltage identical with that of the primary winding 11.

As an example, if the reference secondary winding is low by an amount of .005%, the output secondary winding will also be low by the same .005%, so that when the reference winding is compared with the primary winding, an error voltage of .005% of the primary voltage will appear. This voltage induced in the secondary winding of the error-correcting transformer brings the final output voltage into identity with the primary voltage. The difference of .005% of the reference secondary winding to the primary winding will vary with input voltage load and frequency, but irrespective of what this difference is, that difference is always inserted into the output secondary, this condition continuing as long as no current is drawn from the output secondary winding. In the first embodiment, the circuit is suitable only as a reference transformer, since as soon as current is drawn from the output secondary, the reference winding no longer accurately represents the same voltage in the output secondary winding, due to the voltage drop in the secondary winding through the load. This error may also be compensated for, as illustrated in the second embodiment.

Turning now to the second embodiment of the invention, parts corresponding to those of the first embodiment have been designated by similar reference characters, with the additional prefix "2."

With reference to FIGURE 2, the second embodiment differs from the first embodiment in the provision of a small auxiliary current transformer 42 having a secondary winding 43 in series with the output of the secondary winding 213. The primary winding 44 is in series with several turns of additional secondary winding 45 subject to the inductive forces of the primary winding 211. This current transformer feeds back in such a manner that it tends to maintain the output voltage of the output secondary winding constant. Although the transformer is connected directly, various networks (not shown) may be incorporated so that the current can follow any desired slope. This is desirable because the load may be of resistive, inductive reactive, or capacitive reactive nature. The continuity of the load may also vary, and the network may be designed using techniques existing in the art to compensate for such changes. To offer a minimum of electrostatic coupling between the various primary and secondary windings, complete shielding is preferably provided.

Turning now to the third embodiment of the invention, parts corresponding to those of the first and second embodiments have been designated by similar reference characters with the additional prefix "3."

The third embodiment differs from the first and second embodiments in the provision of an additional resistor 53 in parallel with the reference secondary winding 312. The value of the resistor is determined empirically, and will serve the purpose of keeping a constant voltage when a load is impressed upon the output winding 313. Once the value of the resistance ratio has been determined, and inserted as shown, the voltage will remain constant for all resistance loads. In each case, when a resistance load is inserted, a corresponding resistance having the same ratio is inserted at 312.

Turning now to the fourth embodiment of the invention, parts corresponding to those of the first embodiment have been designated by similar reference characters with the additional prefix "4."

The fourth embodiment differs from the third embodiment in the substitution of a load-compensating transformer 51 in lieu of the resistor 53 of the third embodiment. As seen in FIGURE 4 in the drawing, the transformer includes a primary winding 58 having input terminals 59 and 60 connected across the reference winding 412, and a secondary winding 61 connected to a resistor of the same value as the load. This resistance will change the impedance of the transformer to the desired value. Where complex loads are used, by using a similar complex network connected to the secondary winding of the load-compensating transformer 51, the required ratio will be automatically obtained, and the need for computation of a proper compensating resistance eliminated.

We wish it to be understood that we do not consider the invention limited to the precise details of structure shown and set forth in this specification, for obvious modifications will occur to those skilled in the art to which the invention pertains.

We claim:

1. A constant ratio transformer construction comprising: a primary winding, a first reference secondary winding, a second output secondary winding, and an error-correcting transformer; said first and second secondary windings being so positioned with respect to said primary winding as to be subject to an equal inductive force, said error-correcting transformer including primary and secondary windings, said primary winding of said error-correcting transformer being connected in series with said first-mentioned primary winding and said first reference secondary winding, said first-mentioned primary winding and reference secondary winding being connected in parallel; said secondary winding of said error-correcting transformer being connected in series with said second output secondary winding.

2. A constant ratio transformer construction comprising: a primary winding, a first reference secondary winding, a second output secondary winding, and an error-correcting transformer; said first and second secondary windings being so positioned with respect to said primary winding as to be subject to an equal inductive force, said error-correcting transformer including primary and secondary windings, said primary winding of said error-correcting transformer being connected in series with said first-mentioned primary winding and said first reference secondary winding, said first-mentioned primary winding and reference secondary winding being connected in parallel; said secondary winding of said error-correcting transformer being connected in series with said second output secondary winding; a third secondary winding in inductive relation with respect to said first-mentioned primary winding, and an auxiliary current transformer having primary and secondary windings, said primary winding of said auxiliary current transformer being connected in series with said third secondary winding, said secondary winding of said auxiliary current transformer being connected in series with said second output secondary winding.

3. A constant ratio transformer construction comprising: a primary winding, a first reference secondary winding, a second output secondary winding, and an error-correcting transformer; said first and second secondary windings being so positioned with respect to said primary winding as to be subject to an equal inductive force, said error-correcting transformer including primary and secondary windings, said primary winding of said error-correcting transformer being connected in series with said first-mentioned primary winding and said first reference secondary winding, said first-mentioned primary winding and reference secondary winding being connected in parallel; said secondary winding of said error-correcting transformer being connected in series with said second output secondary winding; a third secondary winding in inductive relation with respect to said first-mentioned primary winding, and an auxiliary current transformer having primary and secondary windings, said primary winding of said auxiliary current transformer being connected in series with said third secondary winding, said secondary winding of said auxiliary current transformer being connected in series with said second output secondary winding; and a resistor connected in parallel with said first reference secondary winding.

4. A constant ratio transformer construction comprising: a primary winding, a first reference secondary winding, a second output secondary winding, and an error-correcting transformer; said first and second secondary windings being so positioned with respect to said primary winding as to be subject to an equal inductive force, said error-correcting transformer including primary and secondary windings, said primary winding of said error-correcting transformer being connected in series with said first-mentioned primary winding and said first reference secondary winding, said first-mentioned primary winding and reference secondary winding being connected in parallel; said secondary winding of said error-correcting transformer being connected in series with said second output secondary winding; and an auxiliary current transformer having primary and secondary windings, said primary winding of said auxiliary current transformer being connected in parallel with said first reference secondary winding, said secondary winding of said auxiliary current transformer being connected in series with a resistance equal to the load impressed upon said output secondary winding.

No references cited.